(12) United States Patent
Chen et al.

(10) Patent No.: US 8,898,045 B2
(45) Date of Patent: Nov. 25, 2014

(54) SYSTEM AND METHOD OF PREDICTING GAS SATURATION OF A FORMATION USING NEURAL NETWORKS

(75) Inventors: Dingding Chen, Plano, TX (US); Weijun Guo, Katy, TX (US); Larry A. Jacobson, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 443 days.

(21) Appl. No.: 13/146,437

(22) PCT Filed: Apr. 21, 2009

(86) PCT No.: PCT/US2009/041222
§ 371 (c)(1),
(2), (4) Date: Jul. 27, 2011

(87) PCT Pub. No.: WO2010/123494
PCT Pub. Date: Oct. 28, 2010

(65) Prior Publication Data
US 2011/0282818 A1 Nov. 17, 2011

(51) Int. Cl.
*G06E 1/00* (2006.01)
*G01V 5/12* (2006.01)

(52) U.S. Cl.
CPC ..................................... *G01V 5/125* (2013.01)
USPC ............................................... 703/10; 706/16

(58) Field of Classification Search
USPC ............................................... 706/16; 703/10
See application file for complete search history.

(56) References Cited

U.S. PATENT DOCUMENTS

| | | | |
|---|---|---|---|
| 2,836,356 | A | 2/1952 | Forrest |
| 3,311,875 | A | 3/1967 | Geyer |
| 3,509,458 | A | 4/1970 | Girard |
| 3,784,828 | A | 1/1974 | Hayes |
| 3,954,006 | A | 5/1976 | Anderson |
| 4,459,479 | A | 7/1984 | Smith et al. |
| 4,852,067 | A | 7/1989 | White |
| 4,937,747 | A | 6/1990 | Koller |
| 5,008,845 | A | 4/1991 | Adcock |
| 5,019,978 | A | 5/1991 | Howard |
| 5,184,079 | A | 2/1993 | Barber |
| 5,210,691 | A | 5/1993 | Freedman |
| 5,251,286 | A | 10/1993 | Wiener |
| 5,300,770 | A | 4/1994 | Allen |

(Continued)

OTHER PUBLICATIONS

Mohaghegh, S., "Virtual-Intelligence Applications in Petroleum Engineering: Part 3-Fuzzy Logic", Journal of petroleum technology 52.11 (2000), pp. 82-87.*

(Continued)

*Primary Examiner* — Ben Rifkin
*Assistant Examiner* — Vincent Gonzales
(74) *Attorney, Agent, or Firm* — Conley Rose, P.C.

(57) ABSTRACT

Predicting gas saturation of a formation using neural networks. At least some of the illustrative embodiments include obtaining a gamma count rate decay curve one each for a plurality of gamma detectors of a nuclear logging tool (the gamma count rate decay curves recorded at a particular borehole depth), applying at least a portion of each gamma count rate decay curve to input nodes of a neural network, predicting a value indicative of gas saturation of a formation (the predicting by the neural network in the absence of a formation porosity value supplied to the neural network), and producing a plot of the value indicative of gas saturation of the formation as a function of borehole depth.

20 Claims, 7 Drawing Sheets

(56) References Cited

U.S. PATENT DOCUMENTS

| | | |
|---|---|---|
| 5,345,077 A | 9/1994 | Allen |
| 5,444,619 A | 8/1995 | Hoskins |
| 5,530,243 A | 6/1996 | Mathis |
| 5,536,938 A * | 7/1996 | Mills et al. .................. 250/269.4 |
| 5,659,169 A | 8/1997 | Mickael et al. |
| 5,684,693 A | 11/1997 | Li |
| 5,753,813 A | 5/1998 | Hagiwara |
| 5,821,413 A | 10/1998 | Chapin |
| 5,828,981 A | 10/1998 | Callender |
| 5,862,513 A | 1/1999 | Messatesta |
| 5,867,806 A | 2/1999 | Strickland |
| 5,883,515 A | 3/1999 | Strack |
| 5,940,777 A | 8/1999 | Keskes |
| 6,044,325 A | 3/2000 | Chakravarthy |
| 6,150,655 A | 11/2000 | Odom |
| 6,207,953 B1 * | 3/2001 | Wilson ....................... 250/269.4 |
| 6,216,089 B1 | 4/2001 | Minerbo |
| 6,219,619 B1 | 4/2001 | Xiao |
| 6,289,285 B1 | 9/2001 | Neff |
| 6,304,086 B1 | 10/2001 | Minerbo |
| 6,374,185 B1 | 4/2002 | Taner |
| 6,381,542 B1 | 4/2002 | Zhang |
| 6,606,565 B1 | 8/2003 | Strickland |
| 6,997,257 B2 | 2/2006 | Snoga |
| 7,280,987 B2 | 10/2007 | Chen |
| 7,361,887 B2 | 4/2008 | Trcka |
| 7,365,308 B2 | 4/2008 | Trcka |
| 7,613,665 B2 | 11/2009 | Chen |
| 2004/0195517 A1 | 10/2004 | Rowland et al. |
| 2004/0257240 A1 | 12/2004 | Chen |
| 2006/0226351 A1 | 10/2006 | Stoller |
| 2006/0243898 A1 | 11/2006 | Gilchrist |
| 2006/0284066 A1 | 12/2006 | Jacobson |
| 2007/0011115 A1 | 1/2007 | Smith |
| 2007/0023623 A1 | 2/2007 | Trcka |
| 2007/0023624 A1 | 2/2007 | Trcka |
| 2007/0023625 A1 | 2/2007 | Trcka |
| 2007/0023626 A1 | 2/2007 | Riley |
| 2007/0246649 A1 | 10/2007 | Jacobi |
| 2008/0228680 A1 | 9/2008 | Chen |

OTHER PUBLICATIONS

Office Action issued by the United States Patent and Trademark Office on Jun. 20, 2012 in U.S. Appl. No. 12/740,726.

PCT International Search Report and Writen Opinion dated May 26, 2009, for PCT Patent Application No. PCT/US2008/074322, filed Aug. 26, 2008.

Quirein, John A. et al. An Assessment of Neural Networks Applied to Pulsed Neutron Data for Predicting Open Hole Triple Combo Data. 44th SPWLA Ann. Logging Symposium, 2003.

Chen, Dingding et al. Neural Network Ensemble Selection Using Multi-Objective Genetic Algorithm in Processing Pulsed Neutron Data. SPWLA 45th Ann. Logging Symposium, Jun. 6-9, 2004.

Quirein, John A. et al. Formation Density Prediction Using Pulsed Neutron Capture Tools. SPWLA 46th Annual Logging Symposium. Jun. 26-29, 2005.

Odom, R. et al. Design and Initial Field-Test Results of a New Pulsed-Neutron Logging System for Cased Reservoir Characterization. SPWLA 49th Ann. Logging Symposium, May 25-28, 2008.

Holmes, Michael et al. A Method to Quantify Gas Saturation in Gas/Water Systems, Using Density and Neutron Logs—Interpretation of Reservoir Properties When Compared with Gas Saturations from Resistivity Analysis. AAPG Rocky Mountain Meeting, 2007.

Bhatt, Alpana. "Reservoir Properties from Well Logs Using Neural Networks." Doctoral dissertation, Norwegian University of Science and Technology, 2002.

Chen, J. et al. Joint Inversion of Seismic AVO and EM Data for Gas Saturation Estimation Using a Sampling-Based Stochastic Model. SEG Int'l Exposition and 74th Ann. Meeting, Oct. 10-15, 2004.

Badruzzaman, A. et al. Multi-Sensor Through-Casing Density and Saturation Measurement Concepts with a Pulsed Neutron Source: A Modeling Assessment. SPE Int'l. Petroleum Conference, Nov. 8-9, 2004 (SPE 89884).

Badruzzaman, A. et al. Progress and Future of Pulsed Neutron Technology in Oil Field Management. SPE Ann. Tech. Conference and Exh., Sep. 27-30, 1998 (SPE 49228).

PCT International Search Report dated Dec. 10, 2002, for PCT Patent Application No. PCT/US2001/49193, filed Dec. 19, 2001.

International Application No. PCT/US2009/041222 Search Report and Written Opinion Dated Jan. 21, 2010.

U.S. Office Action, U.S. Appl. No. 12/740,726, mailed Aug. 16, 2013.

* cited by examiner

SYSTEM AND METHOD OF PREDICTING GAS SATURATION OF A FORMATION USING NEURAL NETWORKS

CROSS-REFERENCE TO RELATED APPLICATIONS

This application claims the benefit of PCT application serial number PCT/US2009/041222, filed Apr. 21, 2009, titled "System and Method of Predicting Gas Saturation of a Formation Using Neural Networks", and is incorporated by reference as if reproduced in full below.

BACKGROUND

In the oil and gas industry, there is an increasing emphasis on estimating geophysical parameters, such as gas saturation, by nuclear interrogation of the formation surrounding the borehole. While techniques have been developed to estimate geophysical parameters based on nuclear interrogation, any improvement in the processing of logging data obtained by nuclear interrogation that makes predictions of geophysical parameters more accurate, faster and/or less expensive to implement provides a competitive benefit.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claim to refer to particular system components. As one skilled in the art will appreciate, oilfield service companies may refer to a component by different names. This document does not intend to distinguish between components that differ in name but not function.

In the following discussion and in the claims, the terms "including" and comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Gamma count rate decay curve" shall mean, for a particular gamma detector, a plurality of count values, each count value based on gammas counted during a particular time bin. The count values may be adjusted up or down to account for differences in the number of neutrons giving rise to the gammas or different tools, and such adjustment shall not negate the status as a "gamma count rate decay curve."

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figures 1, 8:
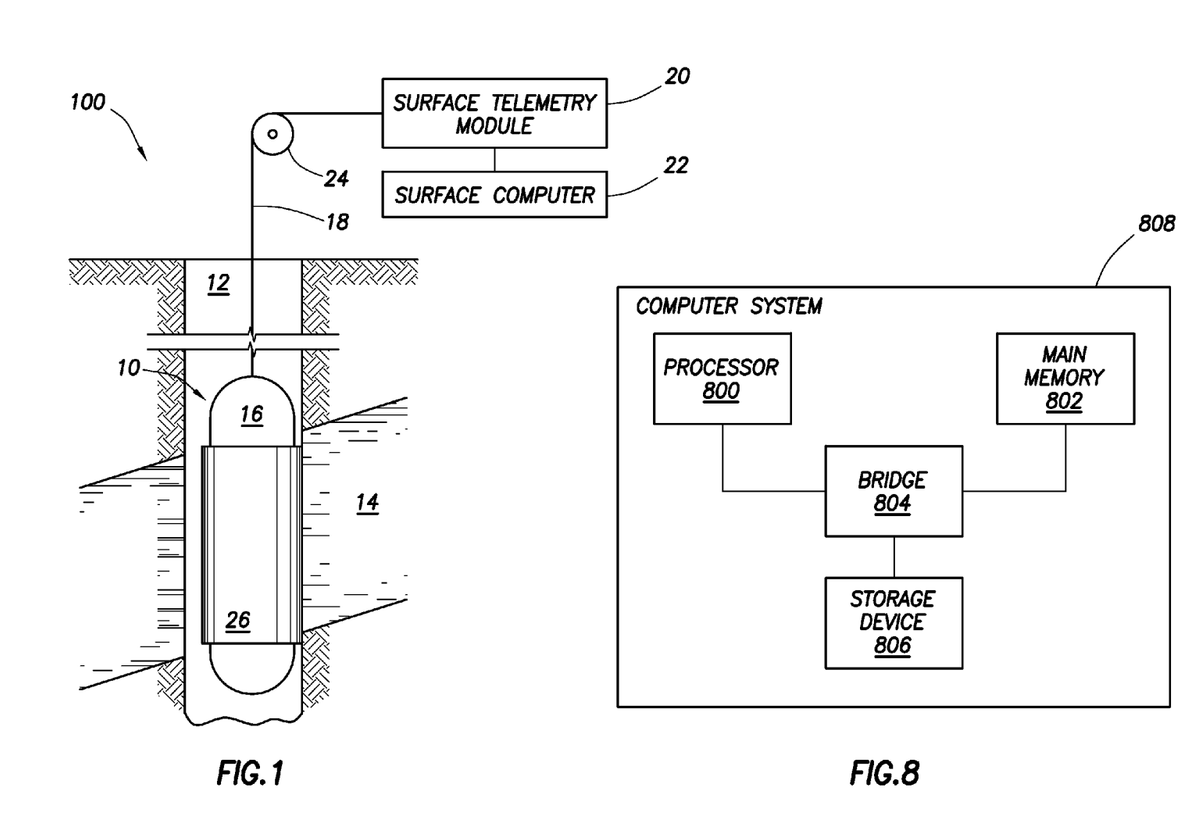
FIG. 1 shows a system in accordance with at least some embodiments.
FIG. 8 shows a computer system in greater detail in accordance with at least some embodiments.

FIG. 1 illustrates a nuclear logging system 100 constructed in accordance with a least some embodiments. In particular, system 100 comprises a logging tool 10 placed within a borehole 12 proximate to a formation 14 of interest. The tool 10 comprises a pressure vessel 16 within which various subsystems of the tool 10 reside, and the pressure vessel 16 is suspended within the borehole 12 by a cable 18. Cable 18, in some embodiments a multi-conductor armored cable, not only provides support for the pressure vessel 16, but also communicatively couples the tool 10 to a surface telemetry module 20 and a surface computer 22. The tool 10 may be raised and lowered within the borehole 12 by way of the cable 18, and the depth of the tool 10 within the borehole 12 may be determined by depth measurement system 24 (illustrated as a depth wheel). In some embodiments, the pressure vessel 16 may be covered with a thermal neutron absorptive coating 26 (the thickness of which is exaggerated for clarity of the figure); however, in other embodiments the thermal neutron absorptive coating may be only partially present, omitted altogether, or may be in the form of a polymeric sleeve telescoped over the pressure housing 16.

Figure 2:
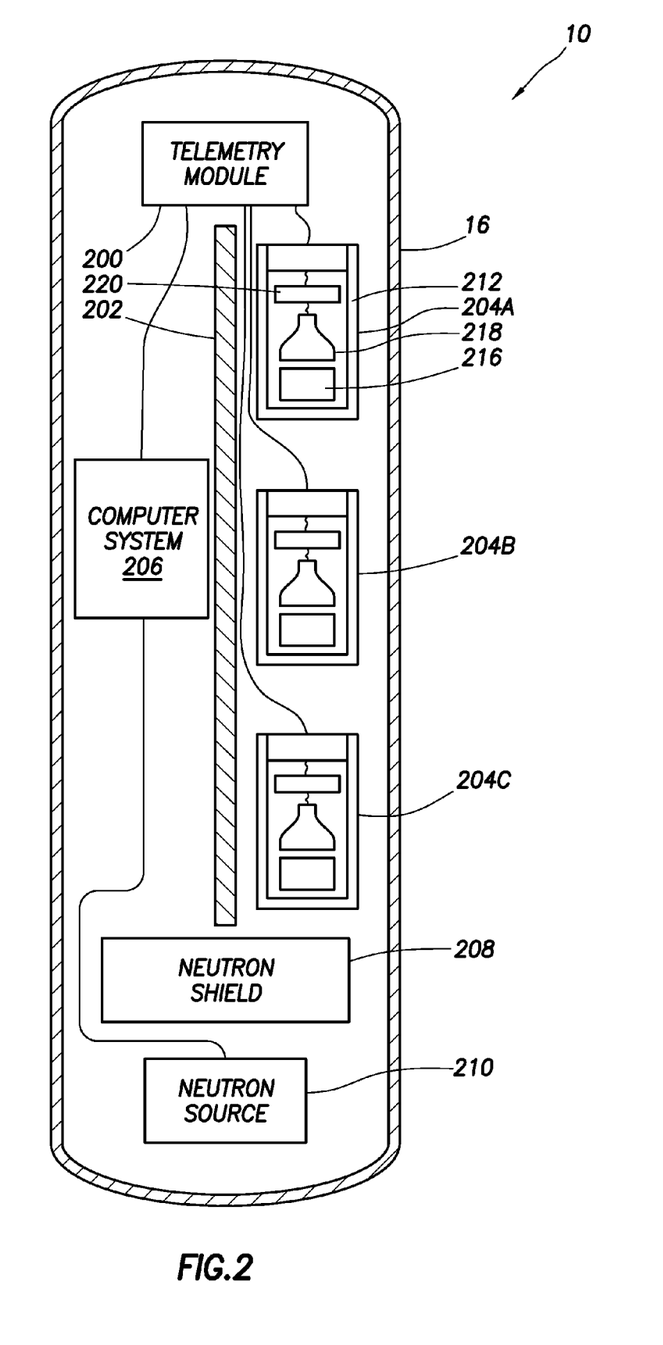
FIG. 2 shows a simplified cross-sectional view of a logging tool in accordance with at least some embodiments.

FIG. 2 shows a simplified cross-sectional view of the logging tool 10 to illustrate the internal components in accordance with at least some embodiments. In particular, FIG. 2 illustrates that the pressure vessel 16 houses various components, such as a telemetry module 200, borehole shield 202, a plurality of gamma detectors 204 (in this illustrative case three gamma detectors) configured to more favorably receive gammas from the formation, computer system 206, a neutron shield 208 and a neutron source 210. While the gamma detectors 204 are shown above the neutron source 210, in other embodiments the gamma detectors may be below the neutron source. Short gamma detector 204C, in some embodiments, may be on the order of 12 inches from the neutron source 210. The far gamma detector 204B may be on the order of 24 inches from the neutron source 210. Finally, long gamma detector 204A may be on the order of 36 inches from the neutron source 210. Other spacings may be equivalently used. The favorability of gamma detectors 204 to formation-sourced gammas is created, at least in part, by the shield material 202, which may be a high density material (e.g., HEVIMET® available from General Electric Company of Fairfield, Conn.).

In some embodiments the neutron source 210 is a Deuterium/Tritium neutron generator. However, any neutron source capable of producing and/or releasing neutrons with sufficient energy (e.g., greater than 10 Mega-Electron Volt (MeV), and in some cased about 14 MeV) may equivalently used. The neutron source 210, under command from a surface computer 22 or computer system 206, generates and/or releases energetic neutrons. In order to reduce the eradiation of the gamma detectors 204 by energetic neutrons from the neutron source 210, the neutron shield 208 separates the neutron source 210 from the gamma detectors 204. The neutron shield may be constructed of a high density material (e.g., HEVIMET®). Because of the speed of the energetic neutrons (e.g., 30,000 kilometers second and/or more), and because of collisions of the neutrons with atomic nuclei that change the direction of movement of the neutrons, a neutron flux is created around the logging tool 10 that extends into the formation 14.

Neutrons generated and/or released by the source 210 interact with atoms by way of inelastic collisions and/or thermal capture. In the case of inelastic collisions, a neutron inelastically collides with atomic nuclei, a gamma is created (an inelastic gamma), and the energy of the neutron is reduced. The neutron may have many inelastic collisions with the atomic nuclei, each time creating an inelastic gamma and losing energy. At least some of the gammas created by the inelastic collisions are incident upon the gamma detectors 204. One or both of the arrival time of a particular gamma and its energy may be used to determine the type of atom with which the neutron collided, and thus parameters of the formation.

After one or more inelastic collisions (and corresponding loss of energy) a neutron reaches an energy known as thermal energy (i.e., a thermal neutron). At thermal energy a neutron can be captured by atomic nuclei. In a capture event the capturing atomic nucleus enters an excited state and the nucleus later transitions to a lower energy state by release of energy in the form of a gamma (known as a thermal gamma). At least some of the thermal gammas created by thermal capture are also incident upon the gamma detectors 204. One or both of the arrival time of a particular gamma and its energy may be used to determine the type of atom into which the neutron was captured, and thus parameters of the formation 14.

Still referring to FIG. 2, the gamma detectors 204 detect arrival and energy of gammas. Referring to gamma detector 204A as indicative of all the gamma detectors 204, a gamma detector comprises an enclosure 212, and within the enclosure 212 resides: a crystal 216 (e.g., a three inch by four inch yttrium/gadolinium silicate scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface computer 22 (FIG. 1) by way of the telemetry module 200, or to the computer system 206 within the tool.

Figure 3:
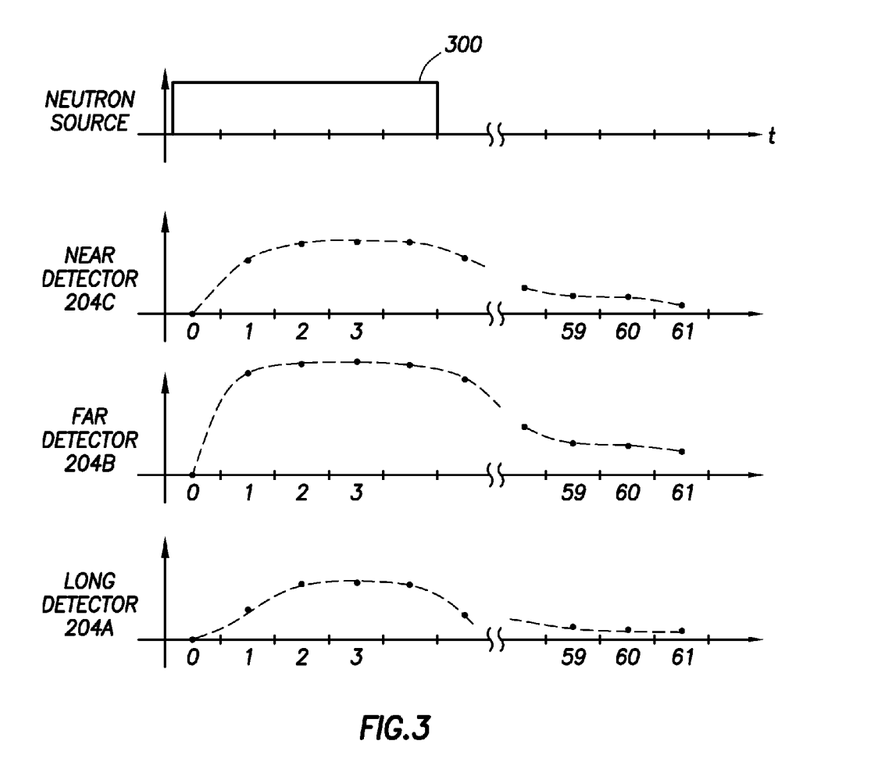
FIG. 3 shows a plurality of graphs of count rate as a function of time in accordance with at least some embodiments.

FIG. 3 shows a plurality of graphs as a function of corresponding time in order to describe how the gamma arrivals are recorded in accordance with at least some embodiments. In particular, FIG. 3 shows a graph relating to activation of the neutron source 210, as well as gamma count rates for the short detector 204C, the far detector 204B, and the long detector 204A. The graph with respect to the neutron source 210 is Boolean in the sense that it shows when the neutron source is generating and/or releasing neutrons, and when the neutron source is not. In particular, with respect to the neutron source graph, the neutron source is generating and/or releasing neutrons during the asserted state 300, and the neutron source is off during the remaining time. In accordance with the various embodiments, a single interrogation (at a particular borehole depth) comprises activating the neutron source for a predetermined amount of time (e.g., 80 microseconds) and counting the number of gamma arrivals at each of the detectors not only during the activation time of the neutron source, but also for a predetermined amount of time after the source is turned off. In at least some embodiments, the total amount of time for a single interrogation (i.e., a single firing of the neutron source and the predetermined amount of time after the neutron source is turned off) may span approximately 1250 microseconds, but other times may be equivalently used.

Still referring to FIG. 3, with respect to counting gamma arrivals by the gamma detectors 204 and 206, the interrogation time is divided into a plurality of time slots or time bins. With reference to the graph for the short detector 204C as illustrative of all the gamma detectors, the interrogation time is divided into 61 total time bins. In accordance with at least some embodiments, the first 32 time bins each span 10 microseconds, the next 16 time bins each span 20 microseconds, and the remaining time bins each span 50 microseconds. Other numbers of time bins, and different time bin lengths, may be equivalently used. Each gamma that arrives within a particular time bin increases the count value of gammas within that time bin. While in some embodiments the actual arrival time of the gammas within the time bin may be discarded, in other embodiments the actual arrival may be retained and used for other purposes. Starting with time bin 0, each gamma detector counts the gamma arrivals and increases the count value for the particular time bin for each gamma arrival. Once the time period for the time bin expires, the system starts counting anew the arrivals of gammas within the next time bin until count values for all 61 time bins have been obtained. In some cases, the system starts immediately again by activating the neutron source and counting further time bins; however, the count values within each time bin (for a particular borehole depth) are recorded either within the tool 10 by computer system 206, or by way of the surface computer 22.

Illustrative count values for each time bin are shown in FIG. 3 as dots in the center of each time bin. The count value for each time bin is represented by the height of the dot above the x-axis (i.e., the y-axis value). Taking all the count values for a particular detector together, the dots may be connected by an imaginary line (shown in dashed form in FIG. 3) to form a mathematical curve illustrative of the number of gamma arrivals as a function of time detected by the particular gamma detector. In accordance with the various embodiments, the plurality of count values is referred to as a gamma count rate decay curve. All the curves taken together (the curve for each gamma detector) may be referred to as full-set decay curves.

Figure 4:
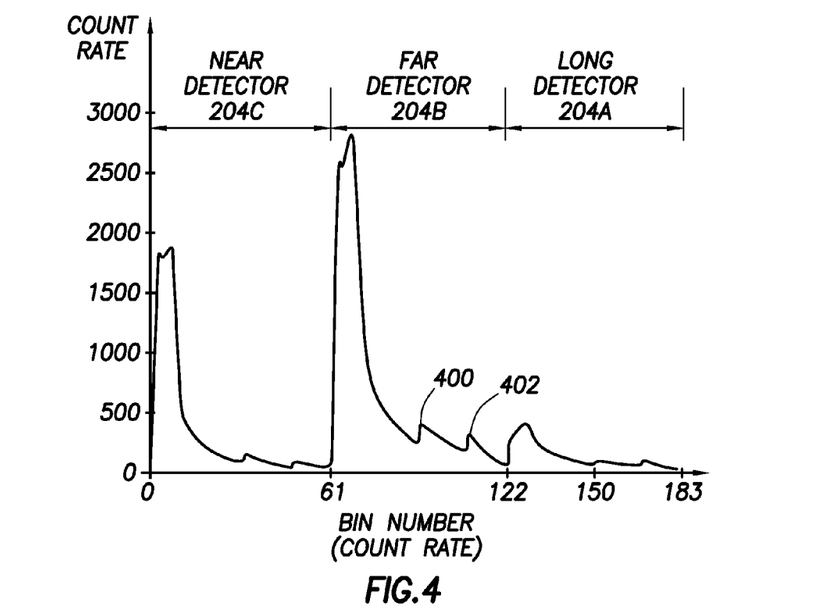
FIG. 4 shows an alternative representation of gamma count rate decay curves in accordance with at least some embodiments.

The illustrative plots of FIG. 3 are shown with respect to time. FIG. 4 shows similar information, except that the x-axis of the plot is bin number rather than time. In particular, if each bin for all the gamma detectors is uniquely numbered there are 183 bins (61 bins times 3 detectors equals 183). Thus, FIG. 4 should not be interpreted to imply that the detector counts take place sequentially; rather, FIG. 4 should only be interpreted as an alternative mechanism to view the count values for a particular interrogation (at a particular borehole depth). FIG. 4 also shows interesting characteristics of the decay curves that were not visible in the illustration of FIG. 3. In particular, and referring to the decay curve for the far detector 204B, the count values take an initial jump to approximately 2800 counts (as a peak) and then fall off at approximately bin number 89. However, the count values jump after bin 89, particularly at point 400 and again at point 402. These apparent increases in count values are indications of increased time bin span, as opposed to an absolute jump in gamma ray count rate. In general, the count values for each detector take an initial jump (during the period of time when the neutron source is activated) and the count values decay as a function of time (or as a function of increasing time bin). The count value within each time bin is proportional not only to formation geophysical parameters, but also the number of neutrons created and/or released by the neutron source during the burst time. In some embodiments, the count values are adjusted to account for fluctuations of the source output, as discussed more below.

The various embodiments are primarily concerned with calculation of gas saturation of the formation surrounding the borehole. Unlike related systems that require knowledge beforehand of the formation porosity to make the determination as to gas saturation, in accordance with the various embodiments gas saturation can be determined without knowing in advance the formation porosity. In some embodiments, formation porosity is not determined at all in the processing of the count rate decay curves. In other embodiments, formation porosity is predicted and/or estimated simultaneously with predicting and/or estimating gas saturation. The processing of the pre-selected count values (whether from the windowed/partial count rate decay curves or the full-set decay curves combined in different manners) to calculate and/or predict gas saturation, and possibly other geophysical parameters, is based on artificial neural networks in the various embodiments.

Figure 5:
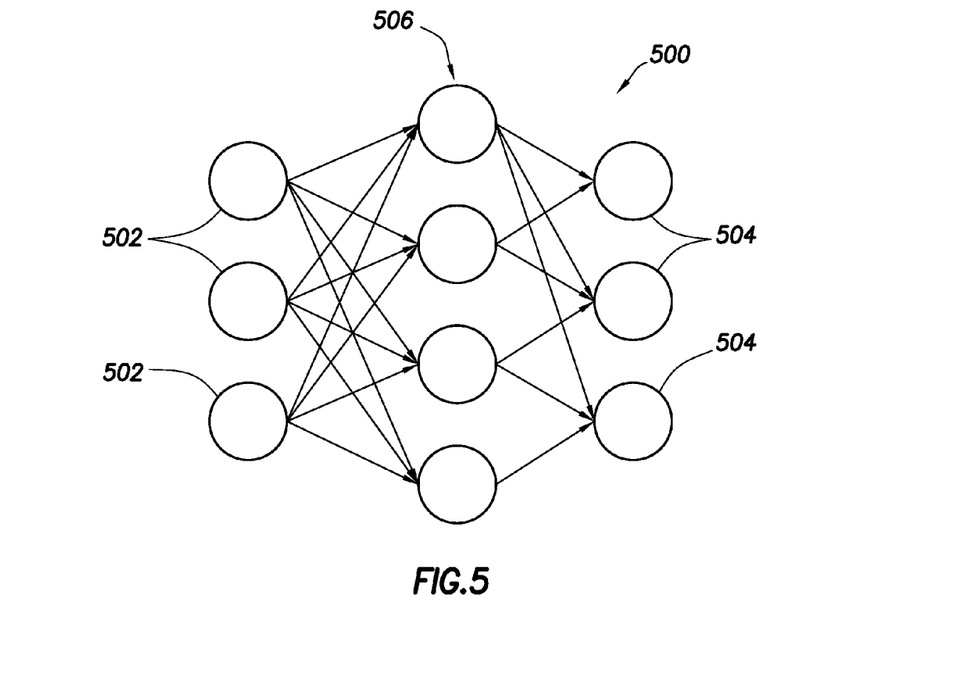
FIG. 5 shows a neural network in accordance with at least some embodiments.

A brief digression into neural networks is helpful in understanding the innovative contributions of the inventors. In particular, FIG. 5 illustrates a simplified neural network 500. The neural network 500 comprises a plurality of input nodes 502. Input nodes 502 are the points within the neural network to which a datum (i.e., a scalar value) is provided for further processing. Moreover, the neural network 500 comprises one or more output nodes 504. Each output node 504 represents a calculated and/or predicted parameter based on the input data at the input nodes 502. Between the input nodes 502 and the output nodes 504 are one or more layers of hidden nodes 506. As shown in FIG. 5, the hidden nodes 506 are coupled to some, or all, of the input nodes 502. Likewise, the hidden nodes 506 are coupled to some, or all, of the output nodes 504. Each of the hidden nodes 506 performs a mathematical function that is determined or learned during a training phase of the neural network 500. While the illustrative FIG. 5 shows three input nodes 502, three output nodes 504, and four hidden nodes 506, any number of input nodes 502 and output nodes 504 may be used. Likewise, any number of hidden nodes 506, and multiple layers of hidden nodes 506, may be used to implement the neural network.

Figure 6:
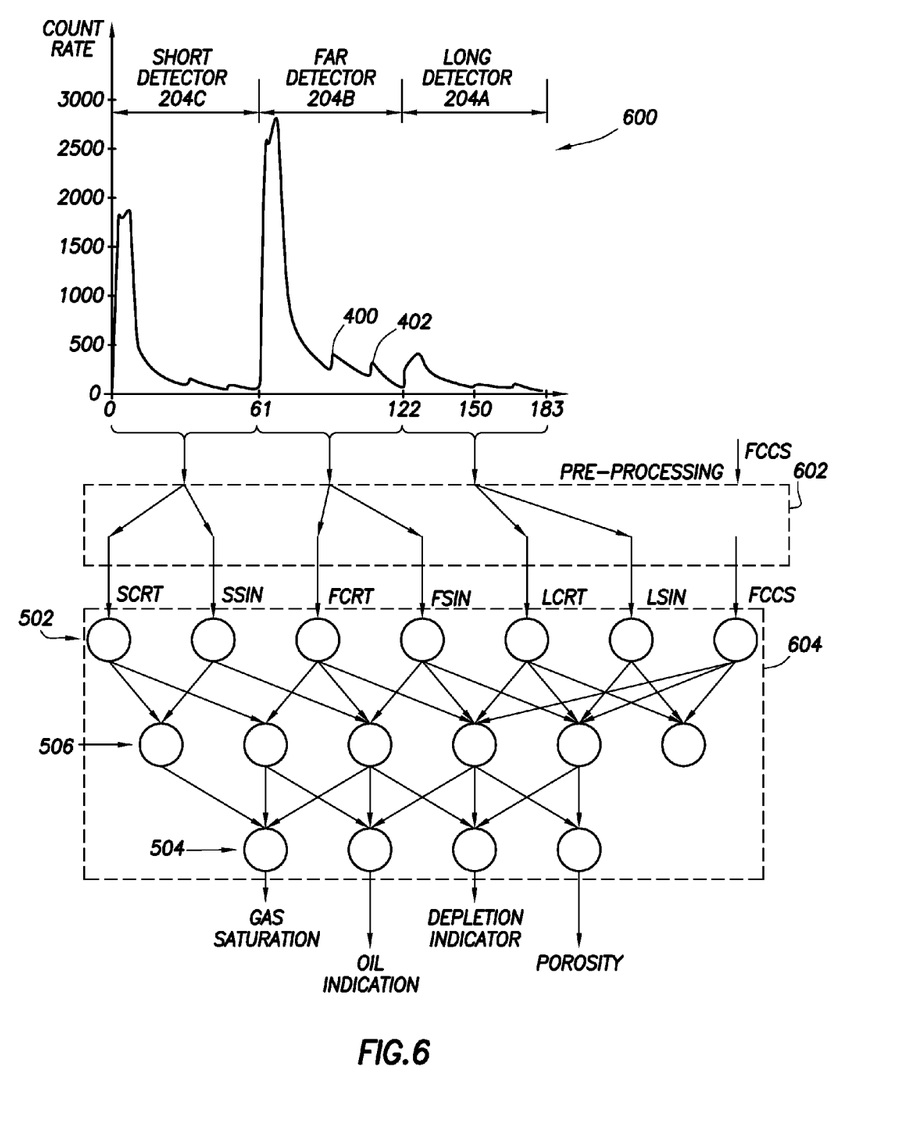
FIG. 6 graphically represents application of count values in time bins to respective input nodes of a neural network in accordance with at least some embodiments.

In accordance with some embodiments, the data applied to the input nodes 502 is at least a portion of each gamma count rate decay curve. In some cases, additional scalar values may also be provided. FIG. 6 graphically illustrates application of the count values to the input nodes 502. In particular, FIG. 6 illustrates a full-set decay curve 600 for a particular depth, pre-processing 602, and a neural network 604. As illustrated, the count rates from the count rate decay curves are applied in these embodiments to pre-processing 602. It is noted that although the full set decay curve 600 is recorded in each logging job, it might not be necessary to be used in full during pre-processing, as the various count values may be drawn directly from the specified time bins and detectors. In accordance with at least some embodiments, seven input nodes 502 of the neural network are used, with each node accepting a scalar value. In these embodiments the seven illustrative inputs are: short detector count rate (SORT); short detector inelastic count rate (SSIN); far detector count rate (FORT); far detector inelastic count rate (FSIN); long detector count rate (LCRT); long detector inelastic count rate (LSIN); and formation capture cross-section (FCCS).

Each of the count rate values (the *CRT scalar values) are representative of thermal gamma count values for the respective detector at the particular depth. For example, in some embodiments each *CRT scalar value is the sum of a predetermined number of count values of the count rate decay curve (e.g., the count value of a plurality of bins when the gammas counted are substantially due to thermal capture) for the particular detector at the particular depth. Each of the inelastic count rate values (the *SIN values) are representative of inelastic gamma count values for the respective detector at the particular depth. For example, in some embodiments each *SIN scalar value is the sum of a predetermined number of count values of the count rate decay curve (e.g., the count value of a plurality of bins when the gammas counted are predominantly due to inelastic collisions) for the particular detector at the particular depth. Thus, pre-processing 602 may select and/or sum count values from each decay curve to create the scalar values applied to each input node 502 of the neural network.

Still referring to FIG. 6, in some embodiments additional parameters, such as formation capture cross section (FCCS), are also applied to an input node of the neural network. Formation capture cross section (sometimes known as macroscopic capture cross section) is a scalar value indicative of the statistical likelihood that atomic nuclei of the formation will capture a neutron at or near thermal energy. In some embodiments, the formation capture cross section is known in advance (e.g., based on tools previously run in the borehole, or based on the capture cross section determined by data from boreholes in close proximity to the borehole under investigation). Thus, in some embodiments the pre-processing 602 obtains the formation capture cross section values. In yet still other embodiments, the pre-processing 602 may calculate the formation capture cross section from the decay curves (e.g., by using a double exponential model).

In accordance with at least some embodiments, the seven illustrative input scalar values are applied to the neural network 604 input nodes 502, and the neural network 604 calculates and/or predicts, simultaneously, output values. While any number of output values may be calculated, with the simplest case being a single output value indicative of gas saturation, in accordance with at least some embodiments four output values are determined and/or calculated by the neural network 604: a numeric value indicative of gas saturation (gas saturation); a logic indication (e.g., 0 or 1) of whether liquid in the formation is oil (oil indication); a logical (e.g., 0 or 1) depletion indicator (i.e., gas pressure within formation pores) (depletion indicator); and a numeric indication of formation porosity (porosity). Thus, in the embodiments illustrated in FIG. 6 the neural network comprises seven input nodes 502 and four output nodes 504. FIG. 6 illustrates a single hidden layer 506 comprising six nodes, but other numbers of hidden layers, and other numbers of hidden nodes, may be equivalently used.

In accordance with yet still other embodiments, rather than a portion of each decay curve being applied to the input nodes 502 of the neural network, the value in each bin of each decay curve is applied to an input node 502. In the illustrative situation of FIG. 6, 183 bins are defined, and thus in the alternative embodiments the neural network 506 implements 183 input nodes for the full set decay curves, and one or more additional nodes for the additional values (such as the formation capture cross section). The 183 bins can also be reduced to 45 condensed bins with each condensed bin summing the count rate over about 4 contiguous original bins. In yet still other embodiments, some decay curves may be applied in their entirety (e.g, the decay curves for the short and far detectors), but only a smaller portion of other decay curves (e.g., the decay curve for the long detector).

Figure 7:
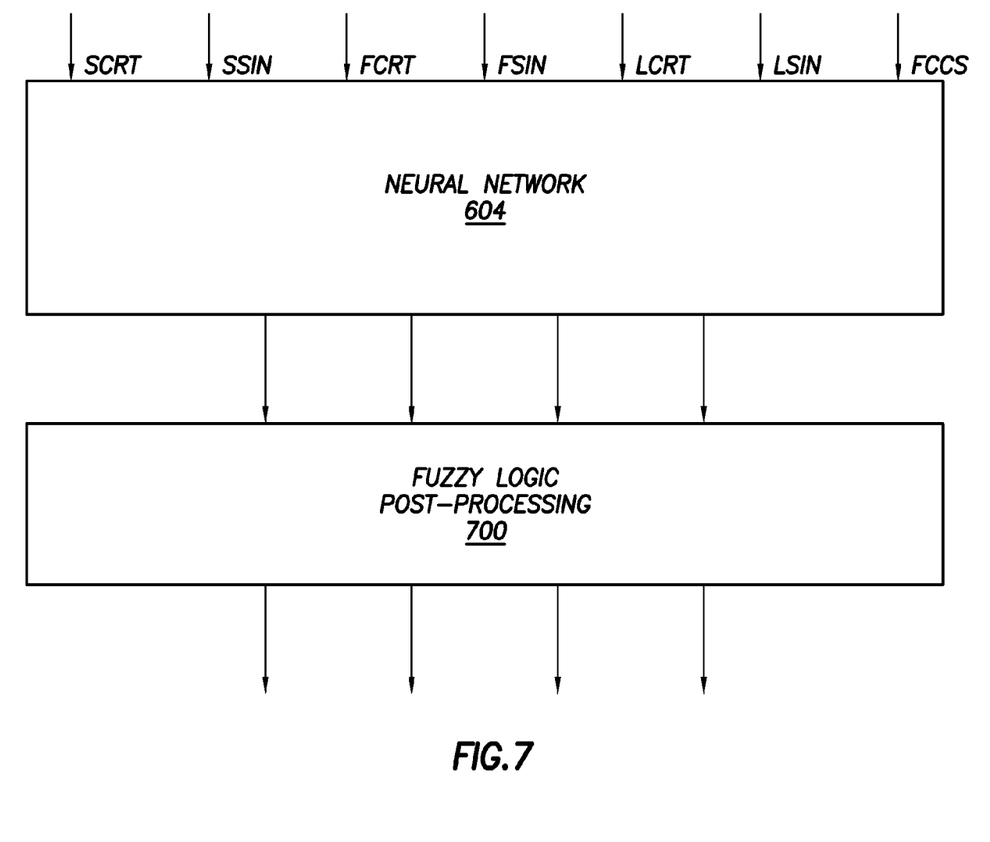
FIG. 7 shows post-processing of the outputs of a neural network in accordance with at least some embodiments.

In some embodiments the output values at the output nodes 504 may be used directly. For example, a plot (e.g., paper plot or "log", or a plot on a display device) of some or all the outputs may be made directly from the values at the output nodes 504. In other embodiments, however, the neural network predictions may subject to post-processing to classify logical outputs, resolve prediction uncertainty, and optimize decision making. FIG. 7 graphically illustrates that the output values of the neural network 604 applied to post processing 700. In some embodiments, the output values from the neural network are the only values applied, and in yet still other embodiments additional parameters may be applied to the post processing 700.

The post processing system 700 may perform any desired task. For example, in some embodiments the post processing system 700 performs quality control checks and may modify outputs based on the engineering and multi-disciplinary judgment. For example, situations where the formation surrounding the borehole at a particular depth is water filled, the gas saturation should be zero, and the oil and depletion indicators should be well positioned in a "no oil" and "no gas density" range as well; however, because the each of the values of the output nodes of the neural network 604 is a scalar value, the scalar values for gas saturation and depletion indicator not reach precisely zero in this illustrative case, and the oil indication may not be firmly in the value range indicating no oil. The post processing system 700 may thus perform quality control, and make slight modifications to the output values to more fully align the output values with the particular situation. In the illustrative case of a water filled formation proximate to the depth of interest, the post processing system 700 may zero otherwise non-zero (but small) values for gas saturation and depletion indicator. Likewise, the post processing system 700 may modify the value for oil indication to ensure that the value is firmly within a range of values indicating the lack of oil. The situation of a water filled formation proximate the depth of interest is merely illustrative of the types of quality control that the post processing system 700 may perform.

In accordance with at least some embodiments, the post-processing 700 performs the various tasks based on a fuzzy logic system. Fuzzy logic systems are logic systems based on multi-valued logic where decisions are made based on degrees of truth, rather than binary or Boolean logic. Multi-disciplinary rules can be implemented with fuzzy system to modulate neural network output, or generate its own output and form a surrogate model ensemble with neural network to provide robust prediction. For example, the cross section area of bulk density and neutron porosity curves plotted in a particular scale may indicate a gas zone with low density and high porosity. Once these curves are available and interpreted in rules with other curves and used in conjunction with neural network prediction, a better decision in determining gas saturation may be achieved. Other logic systems, including a further neural network, may be equivalently used for the post processing system 700.

Neural networks do not inherently know how to calculate and/or estimate geophysical parameters, and thus training of the neural network is needed. The training may take many forms depending on the situation and the type of data available. For example, the inventors of the present specification have found that neural network 604 may be sufficiently trained using such limited sources as data obtained from computer simulated formation, or from laboratory models. However, where actual formation data is available (e.g., from test wells proximate to the formation of interest) further training with the actual data is possible.

The number of neutrons generated and/or released by the neutron source 210 may vary. Stated otherwise, all other geophysical parameters held constant, the count values will change depending on the number of neutrons generated and/or released by the neutron source. The reasons the neutron source may generate and/or release different numbers of neutrons are many. For example, downhole temperature may affect the number of neutrons the neutron source generates and/or releases. Moreover, the neutron source may have inherent fluctuations in the number of neutrons generated and/or released, particularly with sources where the neutrons are created by collisions of atoms on a target material. In some embodiments differences in gamma count values based on the number of neutrons released may be addressed by pre-processing 602 (that is, before applying the count values to their respective input nodes of the neural network). The pre-processing to account for fluctuations in released neutrons may be referred to as normalization, and the normalization may take many forms. In some embodiments the logging tool 10 may comprise a neutron counter integral with the neutron source 210, or the tool 10 may comprise a separate neutron counter at a spaced apart location from the neutron source 210. Regardless of the precise placement of the neutron counter, in embodiments where normalization takes place, the gamma count values may be increased or decreased as a function of the number of neutrons released during the burst period of the interrogation. In yet still other embodiments, the gamma count values may be adjusted based on count values from previous interrogations within the same borehole, or based on neutron logging and corresponding count rates from boreholes in the vicinity of the borehole of interest. Further still, the count values may be adjusted based on count values received from a different logging tool within the same or a different borehole. However, normalization of the count values does not destroy the status of a plurality of count values as being a gamma count rate decay curve.

In accordance with at least some embodiments, the processing to determine gas saturation and other geophysical parameters may be performed contemporaneously with obtaining the gamma count rate decay curves (e.g., by the computer system 206, or by the surface computer 22), or may be performed at a later time (e.g., by surface computer 22 at the central office of the oilfield services company). FIG. 8 illustrates in greater detail a computer system 808. The computer system 808 described with respect to FIG. 8 could be the surface computer 22 proximate to the borehole during the time period within the tool 10 is within the borehole, or the surface computer 22 could be located at the central office of the oilfield services company. Likewise, the computer system 808 could be computer system 206 within the tool 10. The computer system 808 comprises a processor 800, and the processor couples to a main memory 802 by way of a bridge device 804. Moreover, the processor 800 may couple to a long term storage device 806 (e.g., a hard drive) by way of the bridge device 804. Programs executable by the processor 800 may be stored on the long term storage device 806, and accessed when needed by the processor 800. The program stored on the long term storage device 806 may comprise programs to implement the various embodiments of the present specification, including programs to implement the artificial neural networks, as well as the pre-processing and post-processing. In some cases, the programs are copied from the long term storage device 806 to the main memory 802, and the programs are executed from the main memory 802. The geophysical parameters predicted by the computer system 808 may be sent to a plotter that creates a paper-log, or the geophysical parameters may be sent to a computer screen which may make a representation of the log for viewing by a geologist or other person skilled in the art of interpreting such logs.

Figure 9:
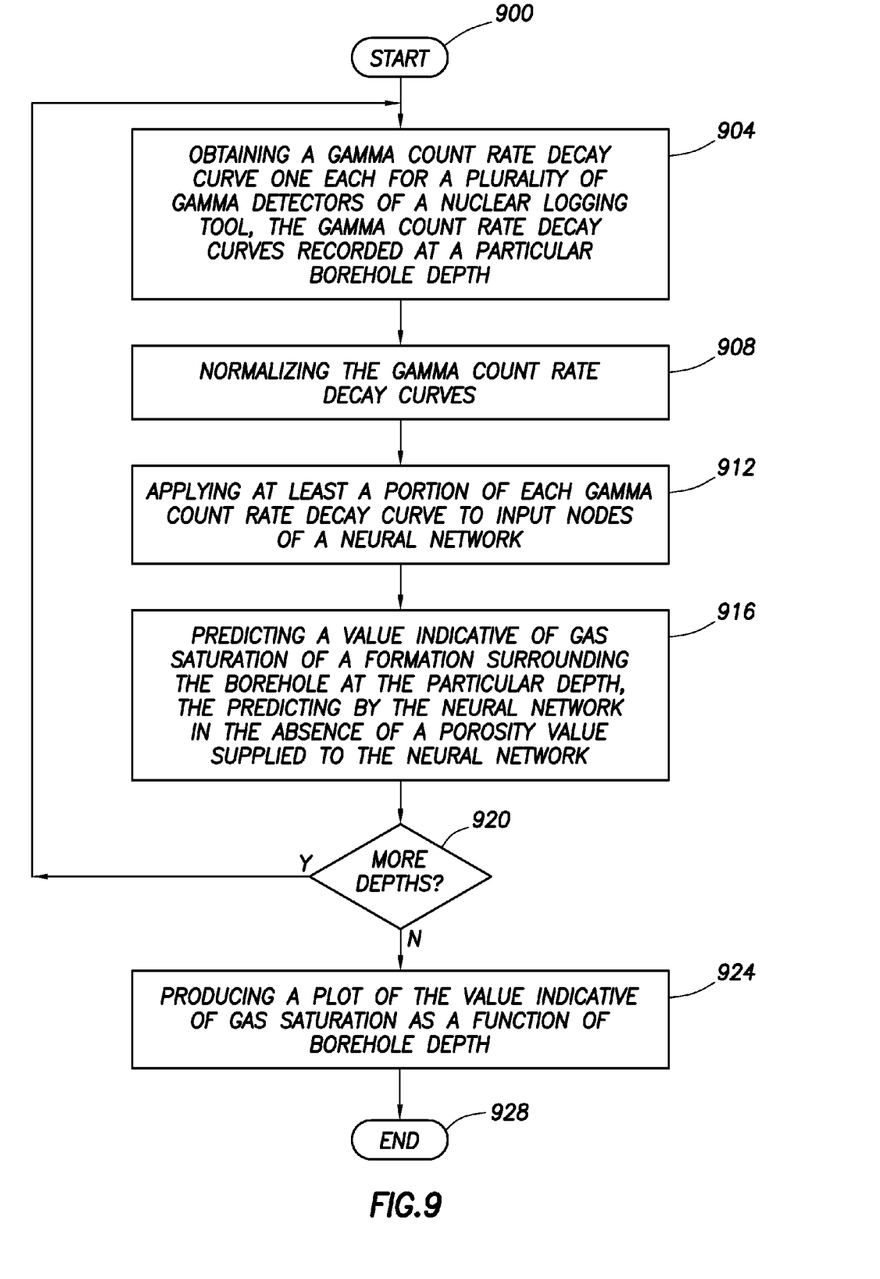
FIG. 9 shows a method in accordance with at least some embodiments.

FIG. 9 illustrates a method in accordance with at least some embodiments. In particular, the method starts (block 900) and proceeds to obtaining a gamma count rate decay curve one each for a plurality of gamma detectors of a nuclear logging tool, the gamma count rate decay curves recorded at a particular borehole depth (block 904). The obtaining may be contemporaneously with further processing to determine gas saturation and other geophysical parameters, or the obtaining may be from a database of gamma count rate decay curves generated based on operation of the nuclear logging tool non-contemporaneously with the applying. In some embodiments the illustrative method next involves normalizing the gamma count rate decay curves (block 908), such as to account for fluctuations in the number of neutrons released during the interrogation. Next the illustrative method comprises to applying at least a portion of each gamma count rate decay curve to input nodes of a neural network (block 912). The neural network predicts a value indicative of gas saturation of a formation surrounding the borehole at the particular depth, the predicting by the neural network in the absence of a porosity value supplied to the neural network (block 916). Additional geophysical parameters may also be determined. The obtaining of the gamma count rate decay curves, normalization, applying to the inputs of a neural network and predicting a value of gas saturation may be repeated for a plurality of borehole depths (block 920). Finally, a plot of the value indicative of gas saturation as a function of borehole depth is made (block 924), and the method ends (block 928). If additional geophysical parameters are calculated, additional plots may be made.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments. Numerous variations and modifications will become apparent to those skilled in the art once the above disclosure is fully appreciated. For example, though individual neural networks are illustrated in the various drawings, it will be understood that ensembles of neural networks may be equivalently used, particularly in situations where multiple geophysical parameters are being estimated for any particular borehole depth. The member networks of an ensemble might be trained on the data of diverse individual wells with various numbers of inputs, different input normalizations and data transformation. Moreover, in some embodiments the neural network processing is performed contemporaneously with the gathering of the data by the tool 10. In the contemporaneous situations, the surface computer 22 may not only control the logging tool 10, but may also collect and perform the neural network-based processing of the data to produce the various logs. In other embodiments, the full-set decay curves may be processed at a time after collection of the data, such as by processing by central computer at the home office. Finally, other pre-processing of the data may take place, such as dead-time correction and environmental correction, automatic depth matching, and abnormal signal intensity modulation without affecting scope of this specification. It is intended that the following claims be interpreted to embrace all such variations and modifications.

We claim:

1. A method comprising:
   obtaining a gamma count rate decay curve one each for a plurality of gamma detectors of a nuclear logging tool, the gamma count rate decay curves recorded at a particular borehole depth;
   applying at least a portion of each gamma count rate decay curve to input nodes of a neural network;
   predicting by the neural network a value indicative of gas saturation of a formation surrounding the borehole at the particular borehole depth, the predicting by the neural network in the absence of a formation porosity value supplied to the neural network;
   repeating the obtaining, applying and predicting for a plurality of borehole depths;
   producing a plot of the value indicative of gas saturation of the formation as a function of borehole depth.

2. The method of claim 1 further comprising predicting further comprises predicting by the neural network the value indicative of gas saturation and simultaneously predicting the formation porosity value.

3. The method of claim 1 further comprising:
   predicting further comprises predicting by the neural network the value indicative of gas saturation and at least one additional parameter selected from the group consisting of: an indication of whether liquid in the formation is oil; an indication of gas depletion within the formation; a formation porosity; and
   producing further comprises producing a plurality of plots, one each for the value indicative of gas saturation and at least one additional parameter.

4. The method of claim 3 wherein, after predicting and before producing the plot, applying the value indicative of gas saturation and the at least one additional parameter to post-processing, the post processing based at least in part on fuzzy logic.

5. The method of claim 1 wherein obtaining further comprises operating the nuclear logging tool in the borehole contemporaneously with the applying.

6. The method of claim 1 wherein obtaining further comprises obtaining from a database of gamma count decay curves generated based on operation of the nuclear logging tool non-contemporaneously with the applying.

7. The method of claim 1 wherein applying further comprises applying scalar values to each input node of the neural network, and wherein the scalar values comprise a value indicative of formation capture cross-section, a value indicative of count rate for a first gamma detector, a value indicative of inelastic count rate for the first gamma detector, a value indicative of count rate for a second gamma detector, a value indicative of inelastic count rate for the second gamma detector, a value indicative of count rate for a third gamma detector, and a value indicative of inelastic count rate for the third gamma detector.

8. The method of claim 1 further comprising, before applying, normalizing the gamma count rate decay curves.

9. A system comprising:
   a downhole tool comprising a source of neutrons and a plurality of gamma detectors, each gamma detector counts gamma arrivals to create a gamma count rate decay curve for the respective gamma detector, each gamma count rate decay curve comprising a plurality of time bins with respective count values;
   a computer system comprising a processor and a memory, the computer system communicatively coupled to recorded gamma count rate decay curves;
   the memory stores a program that, when executed by the processor, causes the processor to:
      apply at least a portion of each gamma count rate decay curve to input nodes of a neural network of the program; and
      predict by the neural network a value indicative of gas saturation of a formation surrounding the borehole for each of a plurality of depths within the borehole, the prediction by the neural network in the absence of a formation porosity value supplied to the neural network.

10. The system of claim 9 wherein the neural network of the program on the memory further causes the processor to predict by the neural network the value indicative of gas saturation and simultaneously predict the formation porosity value.

11. The system of claim 9 wherein the computer system is communicatively coupled to the downhole tool by way of a wireline.

12. The system of claim 9 wherein the neural network of the program on the memory further causes the processor to predict an indication of whether liquid in the formation is oil, an indication of gas depletion of the formation, and the formation porosity value.

13. The system of claim 9 further comprising:
   wherein when the processor predicts, the program further causes the processor to predict the value indicative of gas saturation and at least one additional parameter selected from the group consisting of: an indication of whether liquid in the formation is oil; an indication of gas depletion within the formation; a formation porosity; and
   the program further causes the processor to produce a plurality of plots, one each for the value indicative of gas saturation and at least one additional parameter.

14. The system of claim 13 wherein the program further causes the processor, after the prediction and before production of the plot, to perform post-processing using the value indicative of gas saturation and the at least one additional parameter, the post-processing based at least in part on fuzzy logic.

15. The system of claim 9 wherein the downhole tool comprises:
   a first gamma detector at a first elevation, the first gamma detector positioned to favorably receive gammas from the formation;
   a second gamma detector at a second elevation more distant from source of neutrons than the first elevation; and
   a third gamma detector at a third elevation more distant from the source of neutrons than the second elevation.

16. The system of claim 9 wherein, prior to application of the count values to the input nodes, the program normalizes the gamma count rate curves to account, at least in part, for fluctuations of a number of neutrons released by the source of neutrons.

17. A non-transitory computer-readable storage media storing a program that, when executed by a processor, causes the processor to:
   obtain a gamma count rate decay curve for each of a plurality of gamma detectors, each gamma count rate decay curve comprising a plurality of count values for a respective plurality of time bins;
   apply at least a portion of each gamma count rate decay curve to input nodes of a neural network implemented by the program; and
   generate by the neural network implemented by the program a predicted value indicative of gas saturation of a formation surrounding the borehole, the prediction by the neural network in the absence of a formation porosity value supplied to the neural network.

18. The non-transitory computer-readable storage media of claim 17 wherein when the processor generates, the program causes the processor to generate at least one additional parameter selected from the group consisting of: an indication of whether liquid in the formation is oil; an indication of gas depletion within the formation; and a formation porosity.

19. The non-transitory computer-readable storage media of claim 17 wherein, prior to applying, the program causes the processor to modify the gamma count rate decay curves based on fluctuations of a number of neutrons released by the source of neutrons.

20. The non-transitory computer-readable storage media of claim 17 wherein when the processor applies, the program further causes the processor to apply scalar values to each input node of the neural network, and wherein the scalar values comprise a value indicative of formation capture cross-section, a value indicative of count rate for a first gamma detector, a value indicative of inelastic count rate for the first gamma detector, a value indicative of count rate for a second gamma detector, a value indicative of inelastic count rate for the second gamma detector, a value indicative of count rate for a third gamma detector, and a value indicative of inelastic count rate for the third gamma detector.

* * * * *